Oct. 10, 1950  F. V. BOTT  2,525,090
ROTARY LAWN RAKE
Filed Aug. 29, 1947  2 Sheets-Sheet 1
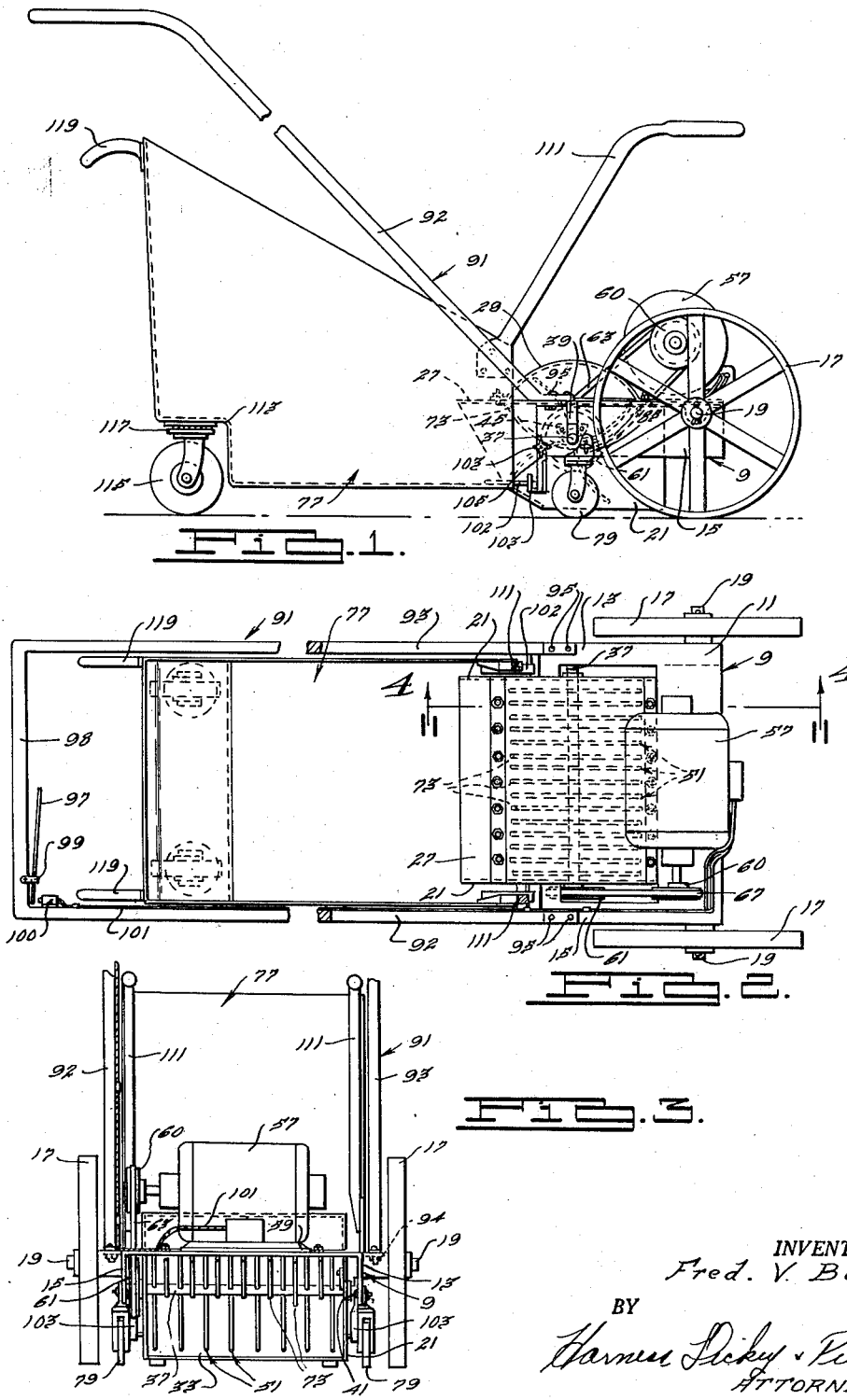
INVENTOR.
Fred. V. Bott.
BY
Harness Dickey & Pierce
ATTORNEYS.

Oct. 10, 1950 F. V. BOTT 2,525,090
ROTARY LAWN RAKE
Filed Aug. 29, 1947 2 Sheets-Sheet 2

INVENTOR.
Fred. V. Bott.
BY
Harness, Dickey & Pierce.
ATTORNEYS.

Patented Oct. 10, 1950

2,525,090

UNITED STATES PATENT OFFICE 2,525,090

ROTARY LAWN RAKE

Frederick Victor Bott, Detroit, Mich.

Application August 29, 1947, Serial No. 771,205

2 Claims. (Cl. 56—27)

This invention relates to an improved rotary rake for removing refuse, leaves and the like from the ground.

The principal objects of this invention are to provide an improved rotary lawn rake which will more effectively remove refuse, leaves and the like from lawns and discharge the same into a receptacle or container; to provide an improved rotary lawn rake having a plurality of rotating ground engaging tines for removing refuse from the ground, and cooperating cleaning tines for removing any refuse that may adhere to the rotating tines and deflecting the same into a receptacle attached to said rake; to provide a rotary lawn rake in which the rotary tines are enclosed so as to make the rake safe to use; to provide a rotary lawn rake of the aforementioned type having means thereon for adjusting and retaining the rotary tines in a predetermined relation to the ground; to provide an improved rotary lawn rake of the aforementioned type in which the rotary tines may be driven either by a separate motive means, such as a motor or engine, or by the ground engaging wheels when the rake is pushed along the ground; to provide an improved receptacle which is adapted to be detachably connected to the rear end of the rotary lawn rake to catch any refuse, leaves and the like, and is so constructed and designed that it may be detached from the rotary lawn rake and used independently as a wheelbarrow.

These and other objects of this invention will become apparent from the following detailed description taken in conjunction with the accompanying drawings in which:

Figure 1 is a side elevational view of one embodiment of the invention;

Fig. 2 is a top plan view of the structure illustrated in Fig. 1;

Fig. 3 is a front elevational view of the structure illustrated in Fig. 1;

Figure 4:
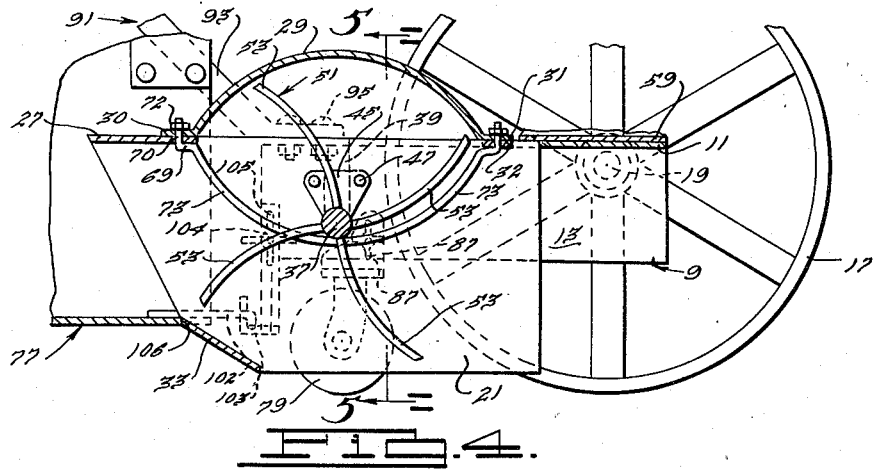
Fig. 4 is an enlarged sectional view of the structure illustrated in Fig. 2 taken substantially along the line 4—4 thereof.

Referring now to the drawings it will be seen that the rotary lawn rake includes a frame, generally indicated at 9, comprising a transversely extending platelike portion 11 at the front end thereof and a pair of spaced, longitudinally extending inverted L-sectioned side-plate portions 13 and 15 which extend rearwardly from the top plate portion 11. Oppositely disposed ground-engaging wheels 17 are supported on the frame 9 adjacent the forward end thereof by means of stub shafts 19 projecting outwardly from and welded to each of the frame side portions 13 and 15.

Figure 5:
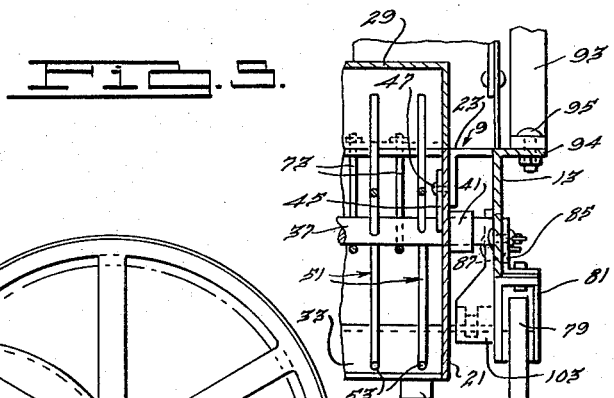
Fig. 5 is a sectional view of the structure illustrated in Fig. 4 taken substantially along the line 5—5 thereof.

Disposed inwardly of each of the frame sides 13 and 15 are a pair of longitudinally extending skirts 21, the rear ends of which project rearwardly beyond the frame sides 13 and 15, and the lower edges of which are disposed in close proximity to the ground. The skirts 21 are welded, as can be seen in Fig. 5, to an inwardly projecting angle-shaped portion 23 of the frame 9 which extends inwardly from each of the frame sides 13 and 15. In this manner the skirts 21 are fixed relative to the frame 9 and are supported thereby. The extreme rear ends of the skirts 21 are interconnected by means of a transversely extending horizontal plate 27 which is welded or otherwise suitably secured to the top edge of each of the skirts.

A domelike shield 29 extends transversely across the top of the skirts 21 and is formed with a rear transversely extending flange 30 (Fig. 4) which abuts the top surface of the plate 27 and is removably connected thereto, as will be described below. The shield 29 is also formed with a front transversely extending flange 31 which is supported by a strap or plate 32 extending between and secured to the frame portions 13 and 15 adjacent the forward ends thereof. The lower edges of the skirts 21 adjacent the rear end thereof are inclined upwardly, and a transversely extending apron 33 is secured to the inclined lower edges of the skirts 21, for a reason which will hereinafter appear. The rear edges of the skirts extend angularly upwardly from the rear edge of the apron 33 so that the plate 27 projects rearwardly beyond the apron.

A transversely extending tine shaft 37 extends through a vertically elongated slot 39 in each of the skirts 21 and is rotatably supported in the frame portions 13 and 15. A collar 41 is fixed to the opposite ends of the shaft 37, outwardly of the skirts 21, to prevent excess lateral movement of the shaft with respect to the skirts. A removable plate 45 is secured by screws 47 to each skirt above the shaft 37 after the latter has been inserted into the slot 39 to prevent the shaft from moving vertically with respect to the skirts 21. Fixed to the shaft 37 between the skirts 21 are a plurality of transversely spaced rakes 51. Each rake comprises four radially spaced, arcuately shaped tines 53 made of flexible metal, bamboo, fiber or the like. The outer ends of the tines 53 are adapted to engage the ground to remove any refuse therefrom and throw the same upwardly and rearwardly, between the skirts and over the apron 33, in a manner which will be hereinafter brought out.

In the embodiment illustrated in Figs. 1 through 5, an electric motor 57 and its mounting plate 59 are mounted on and secured to the front frame portion 11. The motor is provided with a pulley 60 which drives a pulley 61 on the tine shaft 37 through a belt 63 so that when the motor is operated the tines 53 will be rotated in a clockwise direction so as to remove refuse from the ground. While an electric motor is illustrated for driving the tines, it will be appreciated that any suitable type motor or engine may be employed.

A plurality of transversely spaced, arcuately shaped cleaning tines 73, which pass arcuately below the tine shaft 37, are provided for removing any refuse which may adhere to the rotating tines 53. The rear end of each tine 73 is bent to provide a shoulder 69 which abuts the under side of the plate 27, and a vertical threaded stem 70 which extends upwardly through the plate 27 and the shield flange 30. A nut 72 is threaded on the upper end of each stem 70 to removably secure both the cleaning tines and the rear flange of the domelike shield 29 to the plate 27. The front end of each cleaning tine is similarly shaped and connected to the front flange 31 of the shield and the strap 32.

The cleaning tines 73 are closely spaced but permit the rotating tines 53 to pass therebetween. As the stationary cleaning tines 73 are of an arcuate shape and as the clockwise rotating tines 53 are arcuately shaped so as to curve rearwardly and downwardly after passing across the ground, and between adjacent cleaning tines 73, the convex sides of the rotary tines will be presented to the convex sides of the cleaning tines so that any leaves, refuse or the like which may adhere to the tines 53 will be deflected therefrom rearwardly and downwardly between the skirts 21 and into a wheelbarrowlike receptacle 77 connected to the rear end of the frame 9, as will be hereinafter described in detail. In this way, the rotating tines will be kept clean and no clogging or jamming will occur.

A pair of transversely spaced caster wheels 79 are secured to the frame sides 13 and 15 rearwardly of the ground-engaging wheels 17, and substantially below the tine shaft 37. As can be seen in Fig. 5, each of the caster-wheel frames 81 is secured to its frame side 13 or 15 by means of an L-shaped bracket 85. The bracket 85 is provided with a vertical elongated slot 87 which permits the caster wheel to be adjusted vertically and thereby vary the height of the rotating tines 53 with respect to the ground. In this way the tines can be made to penetrate into the ground or lightly brush over the top of the ground, depending on the type of work to be done.

A generally U-shaped operating handle 91 has the forward ends of its longitudinal legs 92 and 93 secured to an outwardly projecting horizontal portion 94 on each of the frame sides 13 and 15 by means of bolts and nuts 95. The handle 91 extends upwardly and rearwardly from the frame 9, and a lever 97 is pivotally mounted on the transverse end leg 98 thereof by means of a bracket 99. A single-pole normally open switch 100 is fixed to the handle leg 92, adjacent the lever 97, and connected by suitable wiring 101 to the electric motor 57. By squeezing the lever 97, it is pivoted about its mounting bracket 99 so that the outer end will engage the switch 100 and close the same so as to operate the motor 57. The motor, therefore, will only be operated when the operator squeezes the lever, and when the lever is released the motor will immediately stop running. As the rotating tines are enclosed by the skirts 21 and domelike shield 29, the rake may be safely used without fear of injury.

The wheelbarrowlike receptacle 77, previously described for use in catching and receiving the refuse thrown rearwardly by the tines, is formed with the receptacle portion having an open top and rear end. The bottom wall of the receptacle 77 is provided with a pair of transversely spaced, rearwardly projecting hooklike members 102 which are adapted to be received in slots provided in channel-shaped brackets 103 which are adjustably connected to the rear end of the frame sides 13 and 15 by means of bolts and wing nuts 104. That is, the rear end of the receptacle is detachably connected to the rear end of the frame 9. The brackets 103 are provided with vertically elongated slots 105 to permit vertical adjustment thereof so that the height of the receptacle can be varied in accordance with the height of the tines 53.

The forward edge of the bottom wall of the receptacle 77 is cut back at 106 so that the side walls thereof will overlap the skirts 21 and the cut-back bottom edge portion will substantially abut the upper rear edge of the apron 33. The plate 27 extending between the skirts 21 at the rear end thereof is disposed within the receptacle and acts as a deflector to prevent refuse from being thrown out the top of the receptacle by the rotating tines. In this way, when the refuse is thrown rearwardly by the tines it will be directed into the receptacle and not spilled on the ground. The side walls of the receptacle fit between the forward ends of the longitudinal legs 92 and 93 of the operating handle 91, and the operating handle extends rearwardly beyond the front wall of the receptacle. A handle 111 is secured to each of the side walls of the receptacle 77 and extends upwardly and rearwardly therefrom so as to be disposed, when connected to the rotary rake, substantially above the ground wheels 17 thereof.

The bottom wall of the receptacle 77 adjacent the front end thereof is upwardly offset at 113, and either a single or a pair of transversely disposed wheels 115 are rotatably connected thereto at 117. A pair of forwardly extending stub handles 119 are secured to the front wall of the receptacle 77 adjacent the upper end thereof to permit handling of the receptacle and connecting the rear end thereof on the brackets 101 of the rotary rake. It will thus be appreciated that the receptacle 77 can be detached from the rotary rake, and the handles 111 can then be used as wheelbarrow handles with the wheels 115 supporting the forward end thereof. Thus after the rotary tines have filled the receptacle, the latter may be easily detached from the rake and wheeled away independently thereof.

Figure 6:
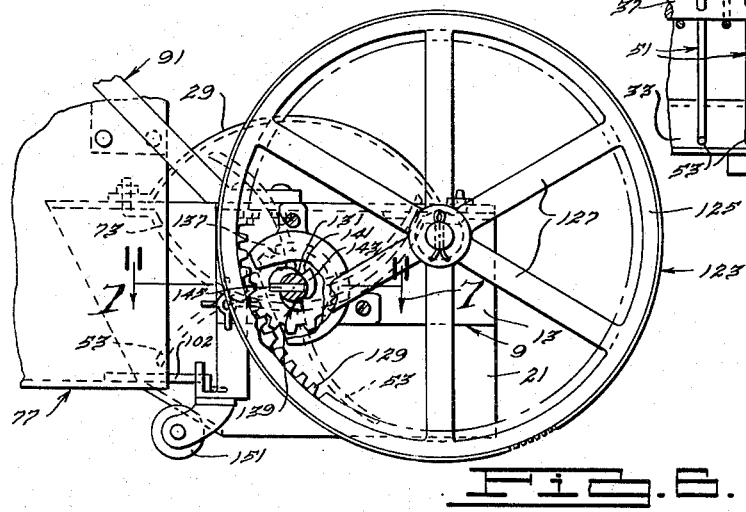
Fig. 6 is a view similar to Fig. 4 illustrating a further embodiment of the invention.
Figure 7:
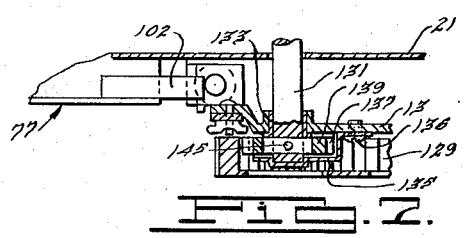
Fig. 7 is a sectional view of the structure illustrated in Fig. 6 taken substantially along the line 7—7 thereof.

In the embodiment illustrated in Figs. 6 and 7 the electric motor 57 is not employed, and the tine shaft is driven by the ground-engaging wheels as the rake is pushed along the ground.

As can be seen in Fig. 6, ground-engaging wheels 123 are provided which have a ground-engaging rim 125 and a plurality of radially extending spokes 127. A plurality of circumferentially spaced gear teeth 129 are formed on the inner periphery of the rim 125. A tine shaft 131 extends transversely through the skirts 21 so as to have its opposite ends disposed within the perimeter of the ground wheels 123. The opposite ends of the tine shaft 131 are journaled in cup-shaped bushings 133 which are mounted in the frame portions 13 and 15. A gear 137 is rotatably mounted adjacent each end of the shaft 131 which continuously meshes with the gear teeth 123 on each wheel rim 125. A cover 135 encloses the outer end of each gear and the shaft and is secured to the frame by means of a rivet 136. A one-way clutch is provided between the tine shaft and each gear 137 so that the tines will only be rotated when the ground wheels rotate in a clockwise direction, i. e., upon forward movement of the rotary rake. Each one-way clutch comprises a cam-like element 139 which is connected to the gear 137 and formed with three circumferentially spaced shoulders 141 and cam surfaces 143. A free floating pin 145 extends through the shaft so as to be operable by the cam element 139. When the ground wheels rotate clockwise, the pin 145 is engaged by one of the cam-element shoulders 141 so that the tine shaft is driven by the gear 137. However, when the wheels are rotated in a counterclockwise direction, so as to back up the machine, the cam surfaces 143 will cam the pin 145 out of engagement with the shoulders 141 so that no rotative motion will be imparted to the tine shaft 131, and thus the tines mounted thereon will not be rotated during rearward movement of the rotary rake.

Caster wheels 151 are again provided for supporting the rear end of the frame 9 of this device. The caster wheels 151 are vertically adjustable in the same manner as that previously described to vary the elevation of the tines and control the amount of ground penetration thereof.

Aside from the features specifically described, the rotary lawn rake of this embodiment is substantially the same as that previously described and will again effectively remove refuse from the ground and deposit the same in the receptacle 77 connected to the rear end thereof.

It will thus be seen that an efficient and easily operated rotary lawn rake is provided which will remove refuse from the lawn and deposit the same in a wheelbarrowlike receptacle which can be detached therefrom and used independently as a wheelbarrow, if so desired.

I claim:

1. A rotary ground rake comprising a frame, ground-engaging wheels supported on said frame adjacent the forward ends thereof, skirt means extending rearwardly from said ground-engaging wheels and fixedly connected to said frame, a shaft rotatably supported in said frame, a plurality of transversely spaced sets of ground-engaging tines mounted on said shaft, motive means operatively connected to said shaft for rotatably driving said tines to cause them to rake the ground and throw any refuse thereon rearwardly, receptacle means secured to the rear end of said frame and receiving a portion of the skirts so as to be adapted to catch ground refuse thrown rearwardly by said tines, an apron extending between said skirt means below said tines to aid in directing refuse rearwardly therefrom into said receptacle means, caster-wheel means adjustably connected to said frame in the area of said tine-carrying shaft for adjusting and retaining said tines in a predetermined relationship with respect to the ground, a plurality of arcuately shaped cleaning tines secured to said frame and extending arcuately beneath said tine-carrying shaft so as to receive said rotating tines therebetween in order to wipe the same and deflect any refuse thereon rearwardly and downwardly into said receptacle means, and cover means carried by said frame over the top of said rotating tines.

2. A rotary ground rake comprising a frame, ground-engaging wheels supported on said frame adjacent the forward ends thereof, skirt means extending rearwardly from said ground-engaging wheels and fixedly connected to said frame, a shaft rotatably supported in said frame, a plurality of transversely spaced sets of arcuately shaped ground-engaging tines mounted in said shaft, motive means operatively connected to said shaft for rotatably driving said tines to cause them to rake the ground and throw any refuse thereon rearwardly, receptacle means secured to the rear end of said frame and adapted to catch ground refuse thrown rearwardly by said tines, an apron extending between said skirt means below said tines to aid in directing refuse rearwardly therefrom into said receptacle means, caster-wheel means adjustably connected to said frame in the area of said tine-carrying shaft for adjusting and retaining said tines in a predetermined relationship with respect to the ground, a plurality of arcuately shaped cleaning tines secured to said frame and extending arcuately beneath said tine-carrying shaft so as to receive said rotating tines therebetween in order to wipe the same and deflect any refuse thereon rearwardly and downwardly into said receptacle means, cover means carried by said frame over the top of said rotating tines, and handle means secured to said frame and extending upwardly and rearwardly therefrom beyond said receptacle means so as to be easily grasped by an operator in order to operate and steer said rotary ground rake.

FREDERICK VICTOR BOTT.

REFERENCES CITED

The following references are of record in the file of this patent:

UNITED STATES PATENTS

| Number | Name | Date |
|---|---|---|
| 666,689 | Phillips | Jan. 29, 1901 |
| 1,204,220 | Whiting | Nov. 7, 1916 |
| 2,206,612 | Linaberry | July 2, 1940 |
| 2,250,846 | Sullivan | July 29, 1941 |